Patented Oct. 17, 1922.

1,432,057

UNITED STATES PATENT OFFICE.

HENRY V. DUNHAM, OF MOUNT VERNON, NEW YORK, ASSIGNOR TO DRY OIL PRODUCTS, LTD., OF LONDON, ENGLAND, A BRITISH CORPORATION.

DRY SHORTENING AGENT AND PROCESS OF MAKING SAME.

No Drawing. Application filed November 6, 1920, Serial No. 422,315. Renewed April 18, 1922. Serial No. 555,227.

*To all whom it may concern:*

Be it known that I, HENRY V. DUNHAM, a citizen of the United States, residing at Mount Vernon, in the county of Westchester and State of New York, have invented certain new and useful Improvements in Dry Shortening Agents and Processes of Making Same, of which the following is a specification.

In my co-pending application, Serial No. 333,696, I have described and claimed the manufacture of a shortening agent, by a process substantially as follows:

A starchy material, such as flour, is mixed with water and boiled or cooked sufficiently to convert all or substantially all of the starch into starch paste, to the liquid (preferably while hot) is then added an oil suitable for cooking purposes, and after emulsification the mixture is homogenized and is then dried. Such a product is highly suitable when used as a shortening agent for bread, biscuits, and the like, but with some kinds of cake and pastry, the product does not give entirely satisfactory results, due to the fact that the amount of water which cooked starch or cooked flour will take up is substantially different from the amount of water which the uncooked starch or flour will take up, with the result that the use of this product in some kinds of cake and pastry has a tendency to make the product more dense or more soggy than is desired, while in products of this character lightness is a desirable property.

I have now found that this objectionable feature can be overcome, by retaining the starch granules largely or wholly in an unbroken condition, all of the steps of the process being performed at a temperature below that at which any great amount of the starch granules would be broken up, or in other words, at a temperature too low to form starch paste from the starch granules. In accordance with the present invention, I proceed as follows:

The starchy material, for example flour, is mixed with cold water or warm water, but not hot enough to break the starchy granules, to form a non-lumping mixture, to which a quantity of water can be subsequently added to bring up the proportion of water to starch material equal to about five parts of water to one part of starchy material.

Any edible oil suitable as a shortening agent, for example, cocoanut oil is then added in such proportions as is desired. It is stated that the proportion of oil can be varied between rather wide limits, about 20% of oil to 80% of flour being given as an example of a low proportion of oil, and about 70% of oil to 30% of flour being given as an example of a high proportion of oil. About 50:50 gives an excellent product, for use in cooking. The mass is then thoroughly mixed to produce something resembling an emulsion and the mixture is then passed through a homogenizer, under a suitable pressure, depending upon the character of the starch, relative proportions of oil, water and starchy material, the temperature of the mixture, and other factors. It may be stated, however, that ordinarily a pressure of from 3,000 to 4,000 pounds is sufficient to produce a white permanent emulsion.

This product is then dried at a low temperature, the process of spraying into a vacuum\chamber is found to give good results. The product thereby produced is a finely-divided pulverulent mixture, containing substantially all of its starch in the form of unbroken starch granules, very little, if any, of the starch being converted into starch paste. It is of course to be understood that during the entire operation, the temperature is kept low enough to prevent the conversion of the starch into starch paste.

The product as produced above is a pulverulent mixture somewhat resembling flour in appearance. The product can be added to flour and sifted therewith in making up cake, pastry, bread, biscuits, and the like.

I am, of course, aware, that it has heretofore been proposed to spray liquid oil, or liquefied hard fat into dry flour. By this method not more than about 10% (or possibly 15% in some cases) of oil can be used. If a larger amount of oil or fat were to be added by this method, the resulting product is so greasy that it could not be sifted or mixed with ordinary flour uniformly. With the product of the present process, however, this objectionable feature is absent, even when the quantity of the oil is in excess of the quantity of flour used.

In some samples which I have made, the quantity of oil was considerably in excess of the quantity of flour without producing the objectionable greasy condition.

While in the above example I have referred particularly to flour and cocoanut oil, it is to be understood that any starchy material and any cooking oil suitable for shortening can be employed.

While I have referred to the spraying process for drying the homogenized emulsion, I do not desire to limit myself to the use of the spraying process; other processes could be used, for example, the product could be dried on rotating drums, heated internally with warm water, which drums could be located in a vacuum chamber if desired, or by hot air. The homogenized emulsion may also be dried by means of a blast of hot air. For example, the mixture ready for drying is placed in a trough, in which a single iron drum with a large exposed surface slowly rotates, the interior of the drum being kept warm by hot water, at a temperature below the point at which starch cells are broken, and a blast of warm air is blown over the exposed portion of the rotating cylinder. As the material dries, a knife is so arranged to remove the dry product.

In some cases, it is advisable also to mix with the emulsion, before homogenization, a small amount, say up to 5%, or so, of casein dissolved in an alkali. This aids in preventing the oil from separating during the drying operation.

I claim:

1. A process of producing a dry product containing oil, which comprises mixing material containing unbroken starch granules with water in such proportions as to form a liquid mass, incorporating an oil into the mass, in proportions (relatively to the flour) between about 1:4 and 7:3, thereafter homogenizing the mixture at a temperature too low to convert any considerable fraction of the starch into starchy paste, and thereafter drying the product at a temperature too low to break any considerable portion of the starch granules.

2. A product consisting of a dry pulverulent mass containing uncooked starchy material and oil, such two materials being thoroughly incorporated with each other, such product capable of being sifted like flour, and the starch granules being principally unbroken, and the amount of oil being between about 20% and 70% of the product.

3. A process which comprises emulsifying oil in a liquid comprising raw starch, homogenizing and drying, all without heating sufficiently to convert the bulk of the starch into starch paste.

In testimony whereof I affix my signature.

HENRY V. DUNHAM.